United States Patent
Herbst et al.

(10) Patent No.: US 7,517,026 B1
(45) Date of Patent: Apr. 14, 2009

(54) CONTROL CIRCUIT FOR TRAILER BRAKES IN A BY-WIRE BRAKE SYSTEM

(75) Inventors: Brian Lee Herbst, Cedar Falls, IA (US); Troy Eugene Schick, Cedar Falls, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 11/951,067

(22) Filed: Dec. 5, 2007

(51) Int. Cl.
  *B60T 13/66* (2006.01)
(52) U.S. Cl. ........................... 303/3; 303/113.4
(58) Field of Classification Search ............... 303/3, 303/7, 15, 113.4, 119.3, 9.61, 22.4
  See application file for complete search history.

(56) References Cited

U.S. PATENT DOCUMENTS

| | | | |
|---|---|---|---|
| 4,557,527 A | 12/1985 | Stumpe | |
| 5,427,440 A * | 6/1995 | Ward et al. | 303/3 |
| 5,443,306 A * | 8/1995 | Broome | 303/3 |
| 5,941,608 A * | 8/1999 | Campau et al. | 303/113.4 |
| 7,128,376 B2 | 10/2006 | Williams et al. | |
| 7,325,884 B2 * | 2/2008 | Ganzel | 303/113.4 |
| 2007/0236084 A1 * | 10/2007 | Frank et al. | 303/119.2 |

* cited by examiner

*Primary Examiner*—Christopher P Schwartz

(57) ABSTRACT

The invention relates to a by-wire brake system. There is a need for a trailer brake control circuit for a by-wire brake system. A brake control circuit for trailer brakes in a by-wire brake system includes a hydraulic pump or a supply of pressurized air, a hydraulic reservoir or an air vent, a pair of solenoid operated proportional valves for controlling communication between the pump, the reservoir and the trailer brakes, and a pair of solenoid operated shutoff valves, each controlling communication between the trailer brakes and a corresponding one of the proportional valves.

9 Claims, 3 Drawing Sheets

US 7,517,026 B1

CONTROL CIRCUIT FOR TRAILER BRAKES IN A BY-WIRE BRAKE SYSTEM

FIELD OF THE INVENTION

The present invention relates to a control system or circuit for trailer brakes in a by-wire hydraulic or pneumatic brake system.

BACKGROUND OF THE INVENTION

In a by-wire brake system at least some of the traditional components such as the pumps, hoses, fluids, belts and brake boosters and master cylinders are replaced with electronic sensors and actuators.

There is a need for redundant electro-hydraulic and electro-pneumatic control circuits for trailer brakes in a by-wire brake system. The circuits must be capable of functioning even if one of the internal components fail, while at the same time, still achieving all of the requirements for a hydraulic or pneumatic trailer brake system.

SUMMARY OF THE INVENTION

Accordingly, an object of this invention is to provide a control circuit for electro-hydraulic and electro-pneumatic by-wire trailer brakes which can function even if one of the internal components fails.

This and other objects are achieved by the present invention, wherein electro-hydraulic and electro-pneumatic control circuits for trailer brakes in a by-wire brake system include a pair of solenoid operated proportional valves and a pair of solenoid operated shutoff valves. These valves control communication between a pressure source, a reservoir and the trailer brakes. Each shutoff valve is between a trailer brakes and a corresponding one of the proportional valves. Thus, the circuit includes four electro-hydraulic or electro-pneumatic valves. The circuit includes a pair of valves on each side of the circuit. Each side of the circuit includes a proportional valve to achieve the trailer braking function and a shutoff valve to stop the proportional valve from working unintentionally.

DESCRIPTION OF THE PREFERRED EMBODIMENTS

Figure 1:
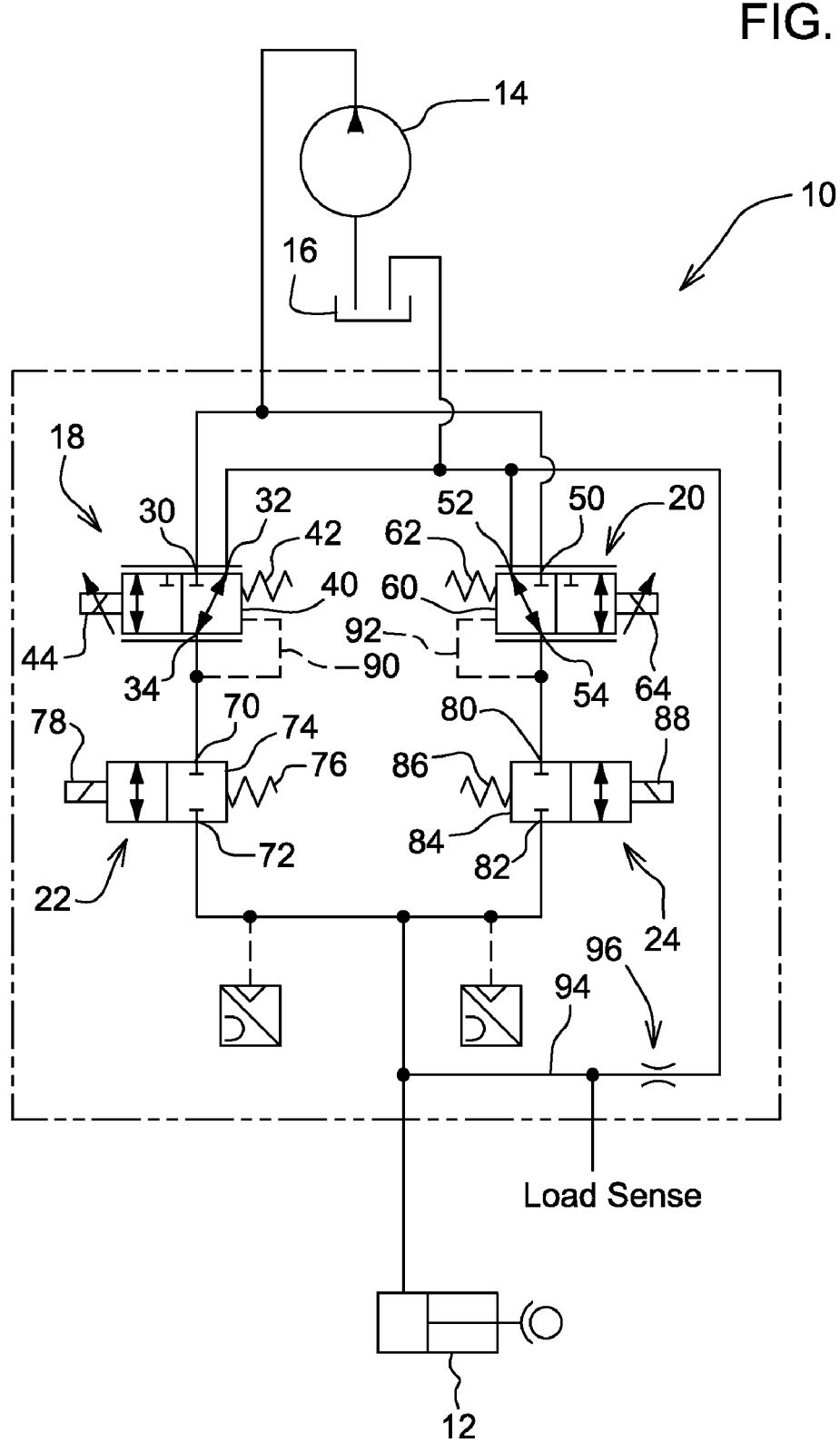
FIG. 1 is a schematic diagram of a control circuit of the present invention for hydraulic brakes.

Referring to FIG. 1, a brake control circuit 10 is installed as part of a by-wire brake system (not shown) on a vehicle (not shown) such as a tractor, and is connected to trailer brakes 12 on a trailer (not shown). Brake control circuit 10 includes four solenoid operated valves 18, 20, 22 and 24, and is connected to a pump 14 or source of pressurized hydraulic fluid, and to a fluid reservoir 16.

First solenoid operated proportional valve 18 has a first port 30 connected to the source 14, a second port 32 connected to the reservoir 16, and a third port 34. Valve 18 also includes a first valve member 40 movable to a first position wherein the first port 30 is blocked and the second port 32 is communicated with the third port 34. Vale member 40 is also movable to a second position wherein the second port 32 is blocked and the first port 30 is communicated with the third port 34. A spring 42 biases the first valve member 40 to its first position. A solenoid 44 is operable to move the first valve member 40 to its second position;

Second solenoid operated proportional valve 20 has a first port 50 connected to the source 14, a second port 52 connected to the reservoir 16, and a third port 54. A second valve member 60 is movable to a first position wherein the first port 50 is blocked and the second port 52 is communicated with the third port 54. Valve member 60 is also movable to a second position wherein the second port 52 is blocked and the first port 50 is communicated with the third port 54. A spring 62 biases the second valve member 60 to its first position. A solenoid 64 is operable to move the second valve member 60 to its second position;

First solenoid operated shutoff valve 22 has a first port 70 connected to the third port 34 of the first valve 18 and a second port 72 connected to the trailer brake 12. Valve 22 has a third valve member 74 movable to a first position wherein the first and second ports 70 and 72 are blocked, and movable to a second position wherein the first port 70 is communicated with the second port 72. A spring 76 biases the third valve member 74 to its first position. A solenoid 78 is operable to move the third valve member 74 to its second position.

Second solenoid operated shutoff valve 24 has a first port 80 connected to the third port 54 of the second valve 20 and a second port 82 connected to the trailer brake 12. Valve 24 includes a fourth valve member 84 movable to a first position wherein the first and second ports 80 and 82 are blocked, and movable to a second position wherein the first port 80 is communicated with the second port 82. A spring 86 biases the fourth valve member 84 to its first position. A solenoid 88 is operable to move the fourth valve member 84 to its second position.

The circuit 10 also includes a first pilot line 90 which communicates the third port 34 of the first valve to an end of the first valve member 40. A second pilot line 92 communicates the third port 54 of the second valve 20 to an end of the second valve member 60. A load sense line 94 communicating the second ports 72, 82 of the third and fourth valves 22, 24 to the reservoir 16 via a restriction 96.

The proportional valves 18 and 20 can be controlled in response to a variety of inputs, such as tractor brake pressure, pedal position, change in speeds, and/or other inputs.

The output pressure to the trailer brakes 12 is preferably limited by pressure limiting valve (not shown) to 150 bar maximum. Two pressure sensor 98 and 100 make possible fault checking by an electronic control unit (not shown). The pressure sensors 98, 100 in conjunction with the proportional valve that is being activated will provide three values to compare to determine which component is malfunctioning.

Figure 2:
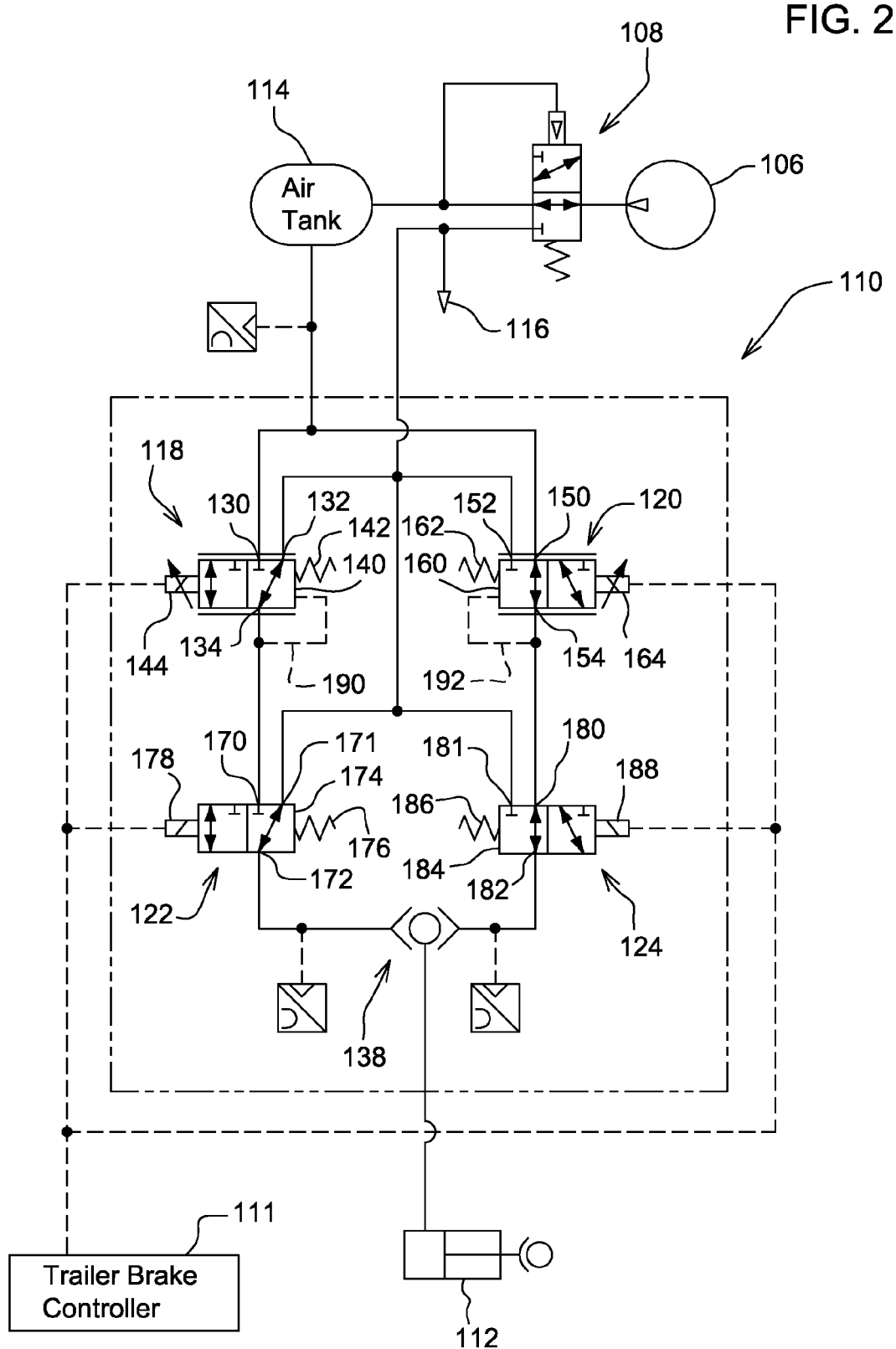
FIG. 2 is a schematic diagram of a control circuit of the present invention for pneumatic trailer brakes and non-spring park brakes.

Referring now to FIG. 2, a brake control circuit 110 is installed as part of a by-wire pneumatic brake system (not shown) on a vehicle (not shown) such as a tractor, and is connected to an electronic trailer brake controller 111 and to pneumatic non-spring trailer brakes 112 on a trailer (not shown). Brake control circuit 110 includes four solenoid operated valves 118, 120, 122 and 124, and is connected to a tank 114 or source of pressurized air and an air vent 116. A regulating valve 108 regulates the pressure in tank 114 supplied by air compressor 106.

First solenoid operated proportional valve 118 has a first port 130 connected to the tank 114, a second port 132 connected to the vent 116, and a third port 134. Valve 118 also includes a first valve member 140 movable to a first position wherein the first port 130 is blocked and the second port 132 is communicated with the third port 134. Valve member 140 is also movable to a second position wherein the second port 132 is blocked and the first port 130 is communicated with the third port 134. A spring 142 biases the first valve member 140 to its first position. A solenoid 144 is operable to move the first valve member 140 to its second position.

Second solenoid operated proportional valve 120 has a first port 150 connected to the source 114, a second port 152 connected to the reservoir 116, and a third port 154. A second valve member 160 is movable to a first position wherein the first port 150 is blocked and the second port 152 is communicated with the third port 154. Valve member 160 is also movable to a second position wherein the second port 152 is blocked and the first port 150 is communicated with the third port 154. A spring 162 biases the second valve member 160 to its first position. A solenoid 164 is operable to move the second valve member 160 to its second position;

First solenoid operated shutoff valve 122 has a first port 170 connected to the third port 134 of the first valve 118, a second port 171 connected to the vent 116 and a third port 172 connected to the trailer brake 112 via a shuttle valve 138. Valve 122 has a third valve member 174 movable to a first position wherein the first port 170 is blocked and second port 171 is communicated to third port 172, and movable to a second position wherein the second port 171 is blocked and port 170 is communicated with the second port 172. A spring 176 biases the third valve member 174 to its first position. A solenoid 178 is operable to move the third valve member 174 to its second position.

Second solenoid operated shutoff valve 124 has a first port 180 connected to the third port 154 of the second valve 120, a second port 181 connected to the vent 116 and a third port 182 connected to the trailer brake 112 via shuttle valve 138. Valve 122 has a third valve member 184 movable to a first position wherein the second port 181 is blocked and first port 180 is communicated to third port 182, and movable to a second position wherein the first port 180 is blocked and port 181 is communicated with the third port 182. A spring 186 biases the third valve member 184 to its first position. A solenoid 188 is operable to move the third valve member 184 to its second position. Valve 138 communicates the higher pressure to the trailer brakes 112.

The circuit 110 also includes a first pilot line 190 which communicates the third port 134 of the first valve to an end of the first valve member 140. A second pilot line 192 communicates the third port 154 of the second valve 120 to an end of the second valve member 160.

Figure 3:
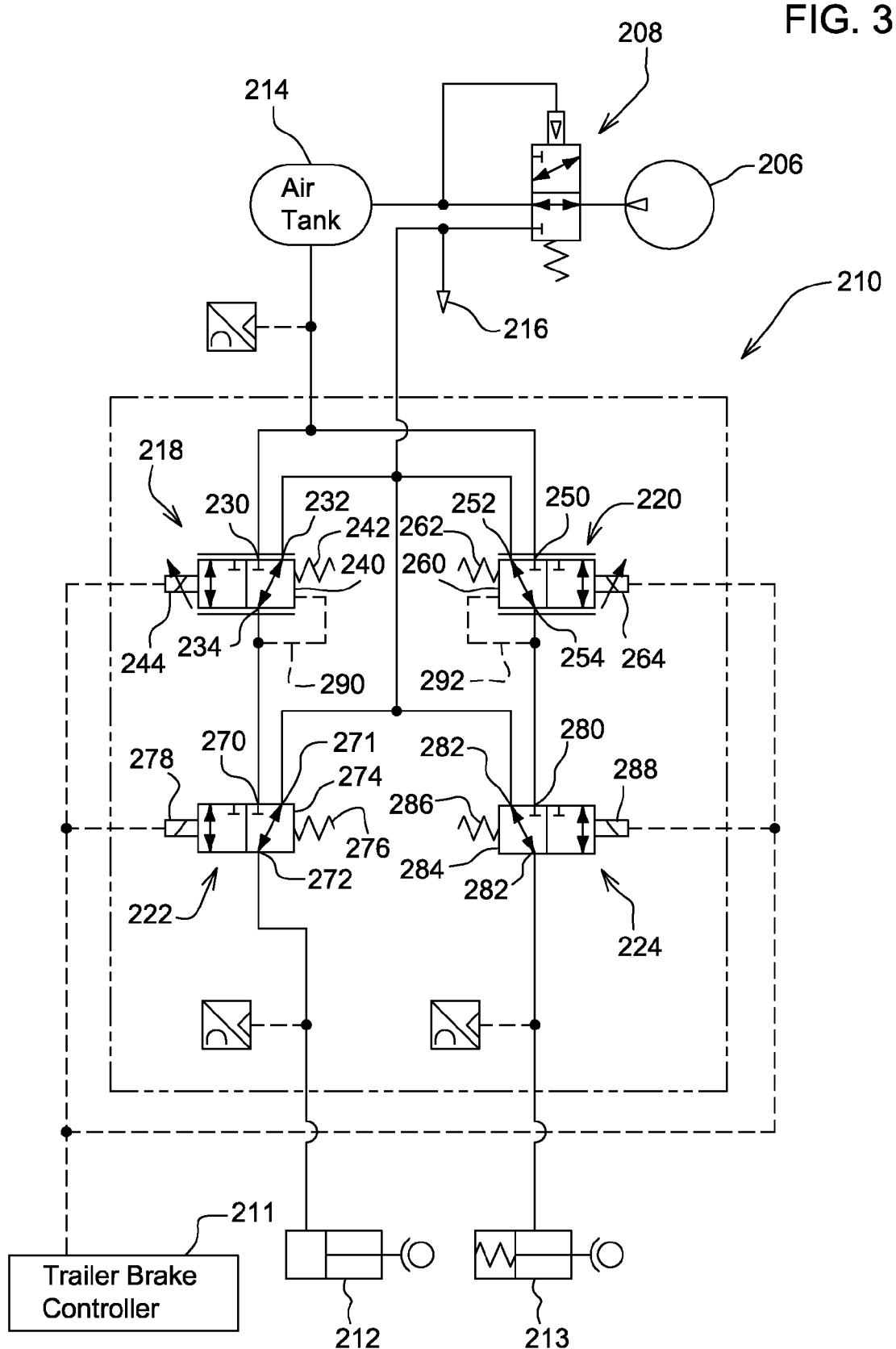
FIG. 3 is a schematic diagram of a control circuit of the present invention for pneumatic trailer brakes and spring park brakes.

Referring now to FIG. 3, a brake control circuit 210 is installed as part of a by-wire brake system (not shown) on a vehicle (not shown) such as a tractor, and is connected to an electronic trailer brake controller 211 and to pneumatic trailer service brakes 212 and pneumatic spring trailer park brakes 213 on a trailer (not shown). Brake control circuit 210 includes four solenoid operated valves 218, 220, 222 and 224, and is connected to a tank 214 or source of pressurized air and an air vent 216. A regulating valve 208 regulates the pressure in tank 214 supplied by air compressor 206.

First solenoid operated proportional valve 218 has a first port 230 connected to the tank 214, a second port 232 connected to the vent 216, and a third port 234. Valve 218 also includes a first valve member 240 movable to a first position wherein the first port 230 is blocked and the second port 232 is communicated with the third port 234. Valve member 240 is also movable to a second position wherein the second port 232 is blocked and the first port 230 is communicated with the third port 234. A spring 242 biases the first valve member 240 to its first position. A solenoid 244 is operable to move the first valve member 240 to its second position.

Second solenoid operated proportional valve 220 has a first port 250 connected to the source 214, a second port 252 connected to the reservoir 216, and a third port 254. A second valve member 260 is movable to a first position wherein the first port 250 is blocked and the second port 252 is communicated with the third port 254. Valve member 260 is also movable to a second position wherein the second port 252 is blocked and the first port 250 is communicated with the third port 254. A spring 262 biases the second valve member 260 to its first position. A solenoid 264 is operable to move the second valve member 260 to its second position.

First solenoid operated shutoff valve 222 has a first port 270 connected to the third port 234 of the first valve 218, a second port 271 connected to the vent 216 and a third port 272 connected to the pneumatic trailer service brake 212. Valve 222 has a third valve member 274 movable to a first position wherein the first port 270 is blocked and second port 271 is communicated to third port 272, and movable to a second position wherein the second port 271 is blocked and port 270 is communicated with the second port 272. A spring 276 biases the third valve member 274 to its first position. A solenoid 278 is operable to move the third valve member 274 to its second position.

Second solenoid operated shutoff valve 224 has a first port 280 connected to the third port 254 of the second valve 220, a second port 281 connected to the vent 216 and a third port 282 connected to the trailer spring-applied park brake 213. Valve 222 has a third valve member 284 movable to a first position wherein the first port 280 is blocked and second port 281 is communicated to third port 282, and movable to a second position wherein the second port 281 is blocked and port 280 is communicated with the third port 282. A spring 286 biases the third valve member 284 to its first position. A solenoid 288 is operable to move the third valve member 284 to its second position.

The circuit 210 also includes a first pilot line 290 which communicates the third port 234 of the first valve to an end of the first valve member 240. A second pilot line 292 communicates the third port 254 of the second valve 220 to an end of the second valve member 260.

With these circuits 10, 110 and 210 the trailer brakes 12, 112, 212 and 213 can be operated even if one of the internal components fail, while still achieving all of the requirements for a hydraulic or pneumatic trailer brake system in a by-wire brake system. The circuit includes four valves to provide redundancy to ensure brake function in the event of a single valve failure. The circuits include redundancy on each side, with each side having a proportional valve to achieve the trailer braking function and a shut off valve to stop the proportional valve from working unintentionally. The two proportional valves can be used to achieve the braking function either individually or in conjunction with one another. The shut off valves are used to shut off one of the proportional valves if it is malfunctioning or to prevent back flow when only one valve is used.

The proportional valves can be sized one of three ways: a) So that service brake mode uses both valves (valves sized for 55-60% of flow rate required). b) So that one valve is used for service brakes with 100% of the flow, and the second valve is at a reduced flow rate (55-60%). c) So that both valves, individually, can be used for service brakes with each being able to flow 100% of the flow.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A brake control circuit for trailer brakes in a by-wire brake system, comprising:
   a fluid pressure source;
   a fluid reservoir;
   a pair of electro-hydraulic proportional valves for controlling communication between the source, the reservoir and the trailer brakes;
   a pair of electro-hydraulic shutoff valves, each controlling communication between the trailer brakes and a corresponding one of the proportional valves, each proportional valve having an outlet connected directly to no other valve other than to an inlet of the corresponding shutoff valve.

2. The brake control circuit of claim 1, comprising:
   a first solenoid operated proportional valve having a first port connected to the pump, a second port connected to the reservoir, a third port, a first valve member movable to a first position wherein the first port is blocked and the second port is communicated with the third port, and movable to a second position wherein the second port is blocked and the first port is communicated with the third port, a spring biasing the first valve member to its first position, and a solenoid operable to move the first valve member to its second position;
   a second solenoid operated proportional valve having a first port connected to the pump, a second port connected to the reservoir, a third port, a second valve member movable to a first position wherein the first port is blocked and the second port is communicated with the third port, and movable to a second position wherein the second port is blocked and the first port is communicated with the third port, a spring biasing the second valve member to its first position, and a solenoid operable to move the second valve member to its second position;
   a first solenoid operated shutoff valve having a first port connected to the third port of the first proportional valve and a second port connected to the trailer brake, a third valve member movable to a first position wherein the first and second ports are blocked, and movable to a second position wherein the first port is communicated with the second port, a spring biasing the third valve member to its first position, and a solenoid operable to move the third valve member to its second position; and
   a second solenoid operated shutoff valve having a first port connected to the third port of the second proportional valve and a second port connected to the trailer brake, a fourth valve member movable to a first position wherein the first and second ports are blocked, and movable to a second position wherein the first port is communicated with the second port, a spring biasing the fourth valve member to its first position, and a solenoid operable to move the fourth valve member to its second position.

3. The brake control circuit of claim 2, further comprising:
   a first pilot line communicating the third port of the first proportional valve to an end of the first valve member; and
   a second pilot line communicating the third port of the second proportional valve to an end of the second valve member.

4. The brake control circuit of claim 2, further comprising:
   a load sense line communicating the second ports of the first and second shutoff valves to the reservoir via a restriction.

5. The brake control circuit of claim 1, wherein:
   the fluid pressure source comprises a tank or pressurized air; and
   the fluid reservoir comprises an air vent.

6. The brake control circuit of claim 5, wherein:
   a first solenoid operated proportional valve having a first port connected to the pump, a second port connected to the reservoir, a third port, a first valve member movable to a first position wherein the first port is blocked and the second port is communicated with the third port, and movable to a second position wherein the second port is blocked and the first port is communicated with the third port, a spring biasing the first valve member to its first position, and a solenoid operable to move the first valve member to its second position;
   a second solenoid operated proportional valve having a first port connected to the pump, a second port connected to the reservoir, a third port, a second valve member movable to a first position wherein the second port is blocked and the first port is communicated with the third port, and movable to a second position wherein the first port is blocked and the second port is communicated with the third port, a spring biasing the second valve member to its first position, and a solenoid operable to move the second valve member to its second position;
   a first solenoid operated shutoff valve having a first port connected to the third port of the first valve, a second port connected to the vent, a third port connected to the trailer brake via a shuttle valve, a third valve member movable to a first position wherein the first port is blocked and second port is communicated to third port, and movable to a second position wherein the second port is blocked and port is communicated with the second port, a spring biasing the third valve member to its first position, and a solenoid operable to move the third valve member to its second position; and
   a second solenoid operated shutoff valve having a first port connected to the third port of the second valve, a second port connected to the vent, a third port connected to the trailer brake via shuttle valve, a third valve member movable to a first position wherein the second port is blocked and first port is communicated to third port, and movable to a second position wherein the first port is blocked and port is communicated with the third port, a spring biasing the third valve member to its first position, and a solenoid operable to move the third valve member to its second position, the shuttle valve communicating a higher pressure to the trailer brakes.

7. The brake control circuit of claim 5, comprising:
   a first solenoid operated proportional valve having a first port connected to the tank, a second port connected to the vent, a third port, a first valve member movable to a first position wherein the first port is blocked and the second port is communicated with the third port, and movable to a second position wherein the second port is blocked and the first port is communicated with the third port, a spring biasing the first valve member to its first position, and a solenoid operable to move the first valve member to its second position;
   a second solenoid operated proportional valve having a first port connected to the source, a second port connected to the reservoir, a third port, a second valve member movable to a first position wherein the first port is blocked and the second port is communicated with the third port, and movable to a second position wherein the second port is blocked and the first port is communicated with the third port, a spring biasing the second valve member to its first position, and a solenoid operable to move the second valve member to its second position;

a first solenoid operated shutoff valve having a first port connected to the third port of the first valve, a second port connected to the vent, a third port connected to a trailer service brake, a third valve member movable to a first position wherein the first port is blocked and the second port is communicated to third port, and movable to a second position wherein the second port is blocked and the first port is communicated with the third port, a spring biasing the third valve member to its first position, and a solenoid operable to move the third valve member to its second position; and a second solenoid operated shutoff valve having a first port connected to the third port of the second valve, a second port connected to the vent, a third port connected to a trailer park brake, a third valve member movable to a first position wherein the first port is blocked and the second port is communicated to the third port, and movable to a second position wherein the second port is blocked and the first port is communicated with the third port, a spring biasing the third valve member to its first position, and a solenoid operable to move the third valve member to its second position.

8. The brake control circuit of claim 1, wherein:
the fluid pressure source comprises a hydraulic pump; and
the fluid reservoir comprises a hydraulic fluid reservoir.

9. A brake control circuit for trailer brakes in a by-wire brake system, comprising:
a fluid pressure source;
a fluid reservoir;
a pair of electro-hydraulic proportional valves for controlling communication between the source, the reservoir and the trailer brakes;
a pair of electro-hydraulic shutoff valves, each controlling communication between the trailer brakes and a corresponding one of the proportional valves, each proportional valve having an outlet connected only to a pilot line and to an inlet of the corresponding shutoff valve.

* * * * *